United States Patent [19]

Sutter, Jr.

[11] Patent Number: 4,589,114
[45] Date of Patent: May 13, 1986

[54] OPTICAL MODE CONTROL FOR A GAS LASER

[76] Inventor: Leroy V. Sutter, Jr., 44 Rocky Knoll, Irvine, Calif. 92714

[21] Appl. No.: 622,093

[22] Filed: Jun. 19, 1984

[51] Int. Cl.⁴ ............................................. H01S 3/098
[52] U.S. Cl. ...................................... 372/19; 372/95; 372/61; 372/87
[58] Field of Search ................. 372/19, 20, 61, 87, 372/55, 92, 95

[56] References Cited

U.S. PATENT DOCUMENTS 3,939,439  2/1976  Fletcher et al. ........................ 372/96
4,464,760  8/1984  Sutter, Jr. .............................. 372/82

Primary Examiner—Léon Scott, Jr.
Attorney, Agent, or Firm—W. Edward Johansen

[57] ABSTRACT

The present invention is an improved gas laser which includes an elongated cylindrical chamber of cross-sectional dimension which has an internal cylindrical wall and which is suitable for confining a laser gas discharge. The internal cylindrical wall has a plurality of grooves extruded on its internal wall surface. A laser gas is disposed in the elongated cylindrical chamber. A pair of reflectors reflect light energy from the laser gas discharge within the elongated cylindrical chamber so that the light energy travels longitudinally the length of the elongated cylindrical chamber and is optically independent of the internal walls of the elongated cylindrical chamber. The improved gas laser also includes a pair of electrode plates which excite the laser gas and an rf generator which applies a voltage between the pair of electrode plates in order to establish a laser gas discharge in said laser gas. The plurality of grooves provide optical mode control. The pair of reflectors may provide either a stable resonator so that the improved gas laser generates a TEM$_{00}$ mode or an unstable (geometric) resonator so that the improved gas laser generates a geometric annular mode.

3 Claims, 18 Drawing Figures

OPTICAL MODE CONTROL FOR A GAS LASER

BACKGROUND OF THE INVENTION

1. Field of the Invention

The present invention relates to a laser bore and external electrode structure of either an rf or dc excited gas laser and more particularly to a plurality of transverse or longitudinal grooves provide optical mode control such with a stable resonator the laser gas generates a $TEM_{00}$ mode and with an unstable (geometic) resonator the gas laser generates an unstable geometric annular mode.

2. Description of the Prior Art

U.S. Pat. No. 4,352,188, entitled RF Pumped Waveguide Laser with Inductive Loading for Enhancing Discharge Uniformity, issued to Glen A. Griffith on Sept. 28, 1982, teaches a discharge-excited waveguide gas laser which utilizes a transverse rf excitation voltage at a frequency of at least about 30 MHz applied between elongated electrodes on opposite sides of the laser discharge chamber and which a plurality of shunt inductances coupled between the electrodes externally along the length of the chamber. These inductances provide a negative admittance which compensates for the variation in the phase angle of the transmission line reflection coefficient along the length of the laser discharge chamber. The variation in the magnitude of the standing wave voltage is reduced accordingly thereby improving the uniformity of the laser-exciting discharge.

U.S. Pat. No. 4,169,251, teaches Waveguide Gas Laser with High Freqency Transverse Discharge Excitation, issued to Katherine D. Laakman on Sept. 25, 1979, teaches waveguide lasers which are excited by means of a transverse discharge at rf frequencies generally in the vhf-uhf range, i.e., from about 30 MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

Recently there has been considerable interest in waveguide gas lasers wherein the laser light propagates through a hollow waveguide which also serves to confine the laser-exciting discharge. U.S. Pat. No. 3,772,611, entitled Waveguide Gas Laser Devices, issued to Peter William Smith on Nov. 13, 1973, teaches the basic excitation scheme which was used in most of the early waveguide lasers and which involves establishing a dc electric discharge longitudinally through the device between a pair of electrodes disposed near the respective ends of the laser waveguide. This type of discharge required relatively large dc excitation voltages of around 10 kv along with the necessary power supply and associated circuitry for generating voltages of this magnitude.

U.S. Pat. No. 3,772,611, also teaches the exciting of a ring-type waveguide laser from an rf source by means of a coil wound around the ring-shaped waveguide. Such a coil-type excitation arrangement not only is incapable of providing a highly uniform discharge, but it also affords poor coupling efficiency. Moreover, when more than a few coil turns are employed, the inductance of the coil becomes sufficiently large to limit the usable excitation frequencies below a few MHz.

In order to obtain a more uniform discharge with reduced excitation voltage, waveguide lasers have been developed wherein a pulsed discharge is established along a transverse waveguide dimension. U.S. Pat. No. 3,815,047, entitled Transversely-Excited Waveguide Gas Laser, issued to Peter William Smith and Obert Reeves Wood on June 4, 1974, teaches transversely-excited waveguide gas lasers which include a structure having a smooth base copper-anode and a plurality of cathode squares plated on a dielectric forming the wall opposite the copper-anode and a laser excitation source which is electrically coupled to the anode and cathode of the structure. The transversely-excited waveguide gas lasers also include an enclosure which encloses the structure and a plurality of gas inlets and outlets which maintain the laser gases at high total gas pressure within the structure. The transversely-excited waveguide gas lasers which have been operated in the quasi-continuous mode at pulse repetition rates as high as 40 kHz, as described in an article by Smith et al., entitled "Repetition-Rate and Quasi-CW Operation of a Waveguide Laser $CO_2$ $TE_{00}$ Laser", published in *Optics Communication*, Volume 16, Number 1, on January 1976, pages 50–53.

U.S. Pat. No. 4,103,255, entitled High Power, Compact Waveguide Gas Laser, issued Howard R. Schlossberg on July 25, 1978, teaches a high power, compact waveguide gas laser housing located within a resonant cavity. The housing has a longitudinal chamber situated therein. The chamber is divided into a plurality of waveguides by a plurality of infrared transmitting partitions. During operation of the laser, the leakage of laser radiation between adjacent waveguides through the partitions causes coupling of the phases of the waveguide modes thereby producing a laser output of high power.

U.S. Pat. No. 3,939,439, entitled Diffused Waveguiding Capillary Tube with Distributed Feedback for a Gas Laser, issued to James C. Fletcher and Charles Elachi on Feb. 17, 1976, teaches a ceramic or glass capillary tube for use in a waveguide gas laser. The inner surface of the capillary tube defines a longitudinal opening through which the laser gas glows. At least a portion of the inner surface is corrugated with corrugations. The corrugations have a periodicity of one-half of the laser gas wavelength.

U.S. Pat. No. 4,464,760, entitled Elongated Chambers for Use in Combination with a Transversely Excited Gas Laser, issued to Leroy V. Sutter, Jr. on Aug. 7, 1984, teaches an improved laser bore and electrode structure which includes an elongated chamber.

SUMMARY OF THE INVENTION

In view of the foregoing factors and conditions which are characteristic of the prior art it is the primary object of the present invention to provide a laser bore and external electrode structure of either an rf or dc excited gas laser which includes a plurality of transverse or longitudinal grooves provide optical mode control such with a stable resonator the laser gas generates a $TEM_{00}$ mode.

It is another object of the present invention to provide a laser bore and external electrode structure of either an rf or dc excited gas laser which includes a plurality of transverse or longitudinal grooves provide optical mode control such with an unstable (geometic) resonator the gas laser generates an unstable geometric annular mode.

In accordance with the present invention an embodiment of an improved gas laser which has optical mode control is described. The improved gas laser includes an elongated cylindrical chamber of cross-sectional dimension which has an internal cylindrical wall and which is suitable for confining a laser gas discharge. The internal cylindrical wall has a plurality of grooves extruded on its internal wall surface. A laser gas is disposed in the elongated cylindrical chamber. A pair of reflectors reflect light energy from the laser gas discharge within the elongated cylindrical chamber so that the light energy travels longitudinally the length of the elongated cylindrical chamber and is optically independent of the internal walls of the elongated cylindrical chamber. The improved gas laser also includes a pair of electrode plates which excite the laser gas and an rf generator which applies a voltage between the pair of electrode plates in order to establish a laser gas discharge in said laser gas. The plurality of grooves provide optical mode control. The pair of reflectors may provide either a stable resonator so that the improved gas laser generates a $TEM_{00}$ mode or an unstable (geometric) resonator so that the improved gas laser generates a geometric annular mode.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
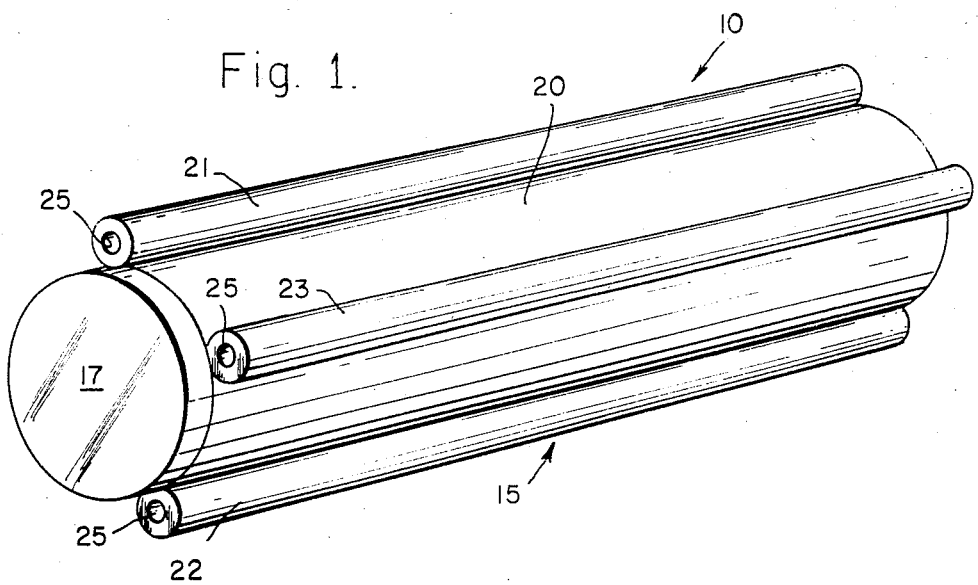
FIG. 1 is a perspective view of the laser bore and electrode structure of a first transversely excited gas laser.

In order to best understand the present invention it is necessary to refer to the following description of its preferred embodiment in conjunction with the accompanying drawing. Referring to FIG. 1 in conjunction with FIG. 2 a first embodiment of a transversley excited gas laser 10 has laser 10 includes an rf generator 11, an improved coupling circuit and a coaxial connector 13 which electrically couples the rf generator 11 to the improved coupling circuit. The improved coupling circuit includes an impedance-matching circuit 14, which is electrically coupled to feed points A and B of a laser bore and electrode structure 15. The transversely excited gas laser 10 further includes a pair of optical reflectors 17, which form a laser resonator.

Referring to FIG. 1 the laser bore and electrode structure 15 includes an elongated cylindrical chamber 20 which is circular in cross-section and which is suitable for confining a laser gas discharge. The elongated cylindrical chamber 20 has a cylindrical wall which is formed from a dielectric material, such as BeO, $Al_2O_3$ or glass. The laser bore and electrode structure 15 also includes a first electrode plate 21, a second parallel plate 22, which is disposed parallel and oppositely to the first electrode plate 21, a third electrode plate 23 and a fourth parallel electrode plate 24, which is disposed parallel and oppositely to the third electrode plate 23 and which is also disposed orthogonally to the first and second electrode plates 21 and 22. Each of electrode plates 21, 22, 23 and 24 has a cooling bore 25 through which a coolant can flow and is formed from an electrically conductive material, such as aluminum or copper. The electrode plates 21, 22, 23 and 24 are used for transverely exciting a laser gas 26 which may be a standard $CO_2$ laser gas mixture including 65% He, 22% $N_2$, 13% $CO_2$ by mole fraction. The rf generator 11 provides an alternating electric field in the elongated cylindrical chamber 20 along a direction transverse to the length of the elongated cylindrical chamber 20 and at a frequency ranging from 10 MHz to about 3 GHz to establish the laser gas discharge in the laser gas 26. The rf generator 11 is electrically coupled to the electrode plates 21, 22, 23 and 24 in phase correlation wherein the first and second electrode plates 21 and 22 are in phase and the third and fourth electrode plates 23 and 24 are in phase with the first electrode plate 21 being 180° out of phase with the third electrode plate. The laser discharge will occur around the outside of the cylindrical wall of the elongated cylindrical chamber 20 and the electrodes 21, 22, 23 and 24 are symmetrically disposed whereby the laser discharge is "doughnut" shaped.

Figure 2:
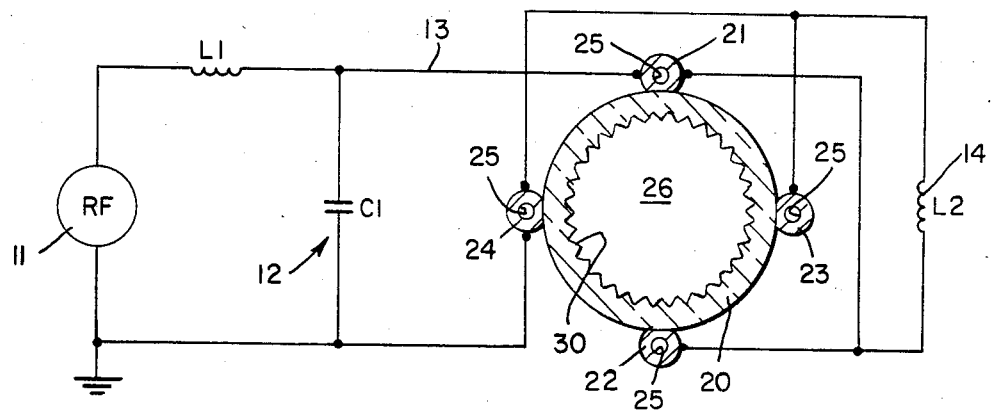
FIG. 2 is a schematic drawing of the first transversely excited gas laser and includes an end elevation view in cross-section of a laser bore and electrode structure which includes an elongated cylindrical chamber which has a plurality of extruded grooves which are constructed in accordance with the principles of the first embodiment of the present invention.
Figure 3:
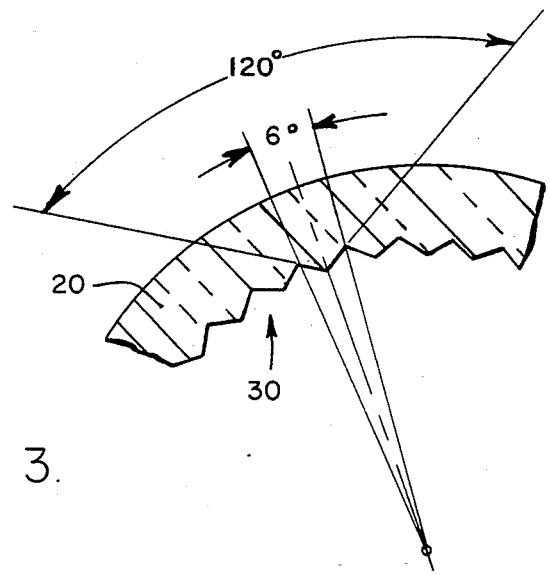
FIG. 3 is an enlarged portion of the end elevation view in cross-section of the laser bore and electrode structure of FIG. 2.

Referring to FIG. 3 in conjunction with FIG. 2 the elongated cylindrical chamber 20 has a plurality of grooves 30 which are extruded and which may run either longitudinally or transversely. The plurality of grooves 30 may also be spiraled. In other embodiments the wall of the elongated cylindrical chamber 20 may be also formed out of either plastic or glass. The plurality of grooves 30 provide optical mode control such with a stable resonator a $TEM_{00}$ mode is generated and with an unstable geometic resonator an unstable (geometric) annular mode is generated. The plurality of grooves 30 will only work with a large bore, non-waveguide gas lasers which may have any combination of multiple external electrode plates. The power may be generated at radio frequency or direct current.

A sufficient amount of the laser gas 26 must be maintained in the elongated chamber 20 in order to support the laser gas discharge. The laser gas 26 is at pressure ranging from 1 Torr to about 1000 Torr. The laser gas 26 is sealed in the elongated cylindrical chamber 20. In the preferred embodiment the pair of optical reflectors 17 are optically aligned with and mechanically coupled to the elongated cylindrical chamber 20 in to seal the laser gas in the elongated cylindrical chamber 20.

The optical reflectors 17 reflect light energy from the laser gas discharge within the elongated cylindrical chamber 20 so that the light energy travels longitudinally the length of the elongated cylindrical chamber 20. In the preferred embodiment the optical reflectors 17 not only reflect, but also guide the light energy within the elongated cylindrical chamber 20 so that the light energy is optically independent of the internal walls of the elongated cylindrical chamber 20.

In another embodiment the transversely excited gas laser 10 may also include a gas inlet and a gas outlet for letting the laser gas 26 into and out of the elongated cylindrical chamber 20 and a gas regulating device for regulating the pressure of the laser gas 26 in the elongated cylindrical chamber 20.

In still other embodiments the transversely excited gas laser 10 may include an enclosure in which the elongated cylindrical chamber 20 is disposed and the laser gas 26 is sealed. The transversely excited gas laser 10 may also include a gas inlet and a gas outlet for letting the laser gas 26 into and out of the enclosure and a gas regulating device for regulating the pressure of the laser gas 26 in the enclosure.

Figure 4:
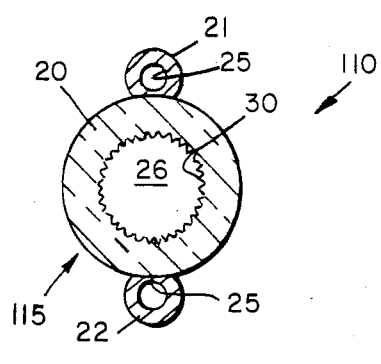
FIG. 4 is a schematic drawing of a second transversely excited gas laser and includes an end elevation view in cross-section of a laser bore and electrode structure which includes an elongated cylindrical chamber which has a plurality of extruded grooves which are constructed in accordance with the principles of the second embodiment of the present invention
Figure 5:
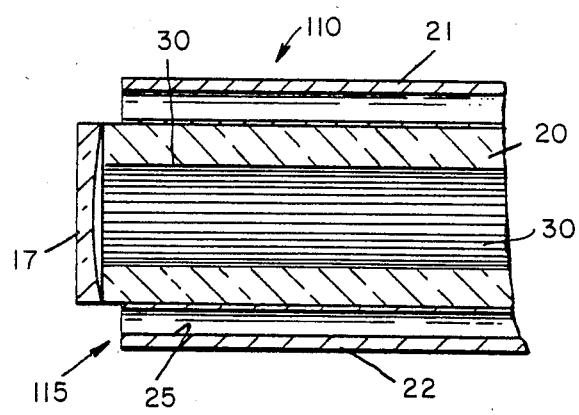
FIG. 5 is a longitudinal cross-sectional view of the elongated cylindrical chamber of FIG. 4.

Referring to FIG. 4 in conjunction with FIG. 5 a second transversley excited gas laser 110 has a laser bore and electrode structure 115 includes an elongated cylindrical chamber 20 which is circular in cross-section and which is suitable for confining a laser gas discharge. The laser bore and electrode structure 115 also includes a first electrode plate 21 and a second parallel plate 22, which is disposed parallel and oppositely to the first electrode plate 21. Each of the electrode plates 21 and 22 has a cooling bore 25 through which a coolant can flow and is formed from an electrically conductive material, such as aluminum or copper. The electrode plates 21 and are used for transverely exciting a laser gas 26.

Figure 6:
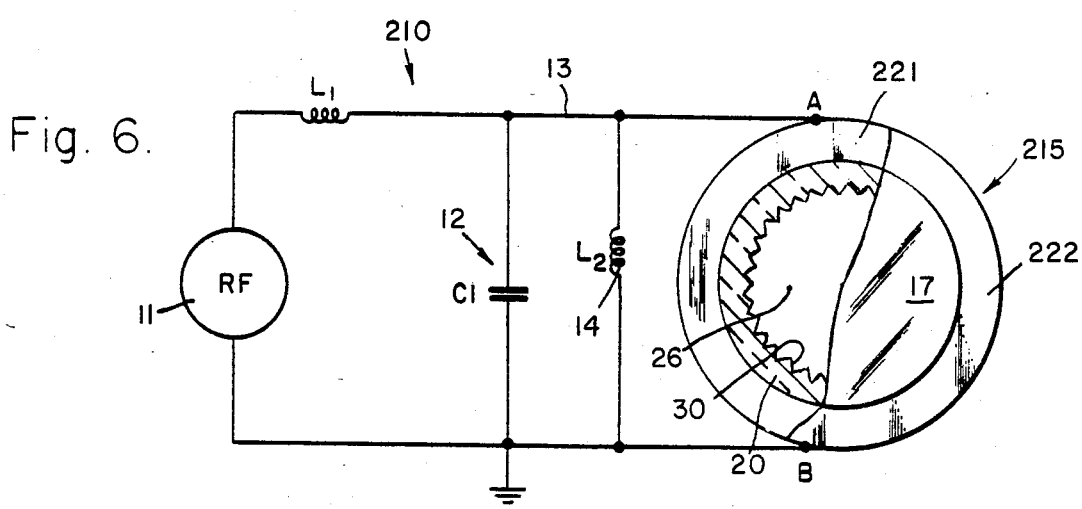
FIG. 6 is a schematic drawing of a third transversely excited gas laser and includes an end elevation view in partial cross-section of a laser bore and electrode structure having an annular electrode configuration which has been constructed in accordance with the principles of the third embodiment of the present invention.

Referring to FIG. 6 a third transversely excited gas laser 210 includes an rf generator 11 which has a first output and a second output which is at ground and which is electrically coupled to the feedpoint B of the first transversely excited gas laser 210, a first coupling circuit 12 which includes a first inductor, $L_1$, which electrically couples the first output of the rf generator 11 to feedpoint A of the first transversely excited gas laser 210 and a coaxial connector 13 which electrically couples first output of the rf generator 11 to the first coupling circuit 12. The first coupling circuit 12 also includes a first capacitor, $C_1$, which electrically couples the first and second outputs of the rf generator 11. A second coupling circuit 14 includes a second inductor, $L_2$, which electrically couples feedpoint A to feedpoint B of a laser bore and electrode structure 215 which includes a cylindrical elongated chamber 20. The third transversely excited gas laser 210 also includes a pair of optical reflectors 17 which form a laser resonator.

Figure 7:
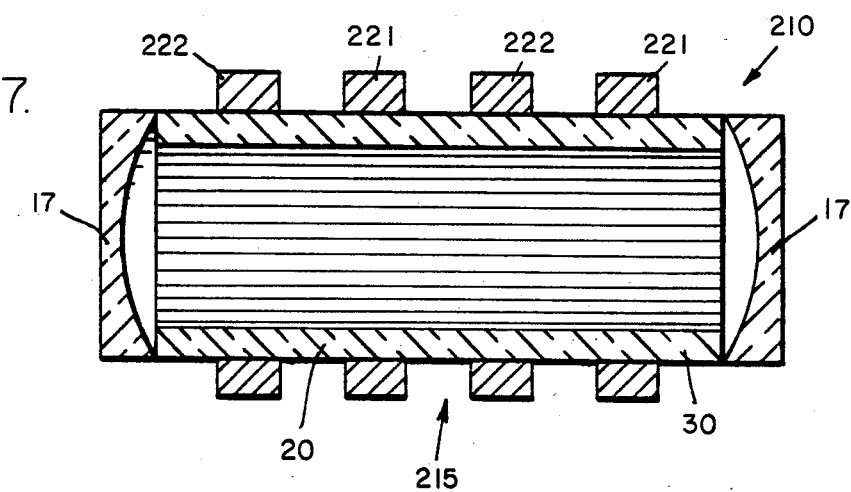
FIG. 7 is a longitudinal view in cross-section of the laser bore and electrode structure of FIG. 6.

Referring to FIG. 6 in conjunction with FIG. 7 the third transversely excited gas laser 210 also includes a first plurality of annular electrode elements 221 and a second plurality of annular electrode elements 222. Each of the annular electrode elements 221 and 222 is formed from an electrically conductive material and is in the shape of an annular element. The first and second pluralities of annular electrode elements 221 and 222 are alternately, longitudinally disposed adjacent to and axially aligned with each other on the outer surface of the elongated cylindrical chamber 20. Each of annular electrode elements 221 and 222 may have a cooling bore through which a coolant can flow and is formed from an electrically conductive material, such as aluminum or copper. The rf generator 11 is able to apply a voltage of alternating polarity between the first and second pluralities of annular electrode elements 221 and 222 at a frequency ranging from 10 Mhz to about 3 GHz. The phase correlation of the configuration of electrodes is such that each of the first plurality of annular electrode elements 221 is in phase with the other, each of the second plurality of annular electrode elements 222 is in phase with the other and the first and second plurality of annular electrode elements 221 and 222 are 180° out of phase with each other. The third transversely excited gas laser 210 will generate annular unstable resonator modes. The laser discharge will occur around the outside of the cylindrical wall of the elongated cylindrical chamber 20 and the electrodes 221 and 222 are symmetrically disposed whereby the laser discharge is "doughnut" shaped.

Figure 8:
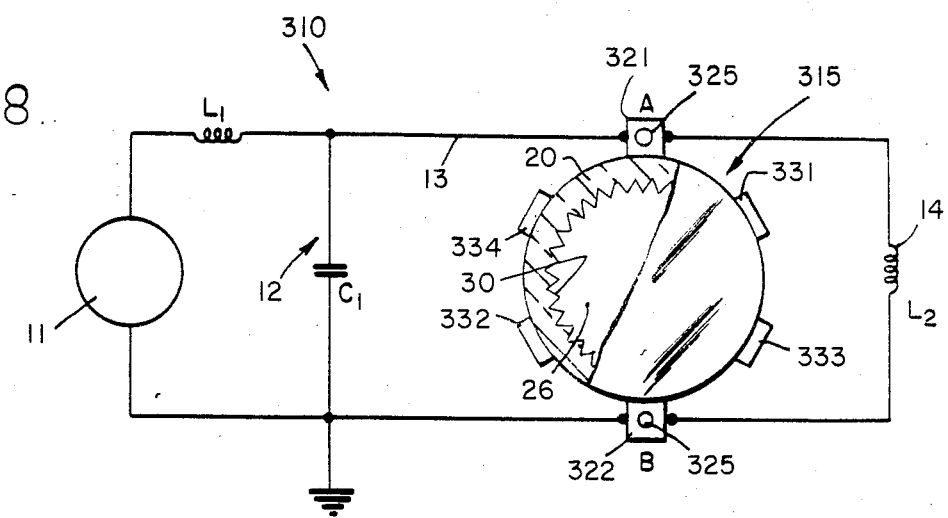
FIG. 8 is a schematic drawing of a fourth transversely excited gas laser and includes an end elevation view in partial cross-section of a laser bore and electrode structure having a floater electrode configuration which has been constructed in accordance with the principles of the fourth embodiment of the present invention.

Referring to FIG. 8 a fourth transversely excited gas laser 310 includes a laser bore and electrode structure 315 and an electrode configuration having a first electrode plate 321 and a second electrode plate 322 which are parallel and disposed oppositely to each other on the outer surface of the elongated cylindrical chamber 20. The phase correlation of the configuration of electrodes is such that the first electrode plate 321 and the second electrode plate 322 are 180 out of phase with each other. Each of the electrode plates 321 and 322 has a cooling bore 325 through which a coolant can flow and is formed from an electrically conductive material, such as aluminum or copper.

Figure 9:
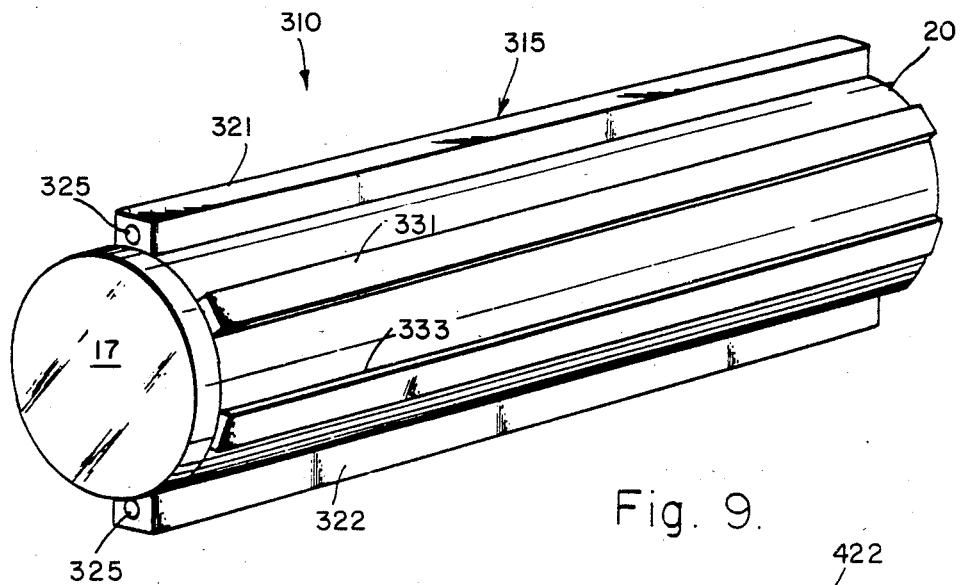
FIG. 9 is a perspective view of the laser bore and electrode structure of the fourth transversely excited gas laser of FIG. 8.

Referring to FIG. 9 in conjunction with FIG. 8 the electrode configuration also has a first floating electrode plate 331, a second floating electrode plate 332, a third floating electrode plate 333 and a fourth floating electrode plate 334, each of which is formed from an electrically conductive material and is disposed on the outer surface of the elongated cylindrical chamber 20. The first floating electrode plate 331 is disposed between the first electrode plate 321 and the third floating electrode plate 333 and oppositely to the second floating electrode plate 332. The second floating electrode plate 332 is disposed between the second electrode plate 322 and the fourth floating electrode plate 334 and oppositely to the second floating electrode plate 332. The capacitance between the first and second electrode plates 321 and 123 and the first, second, third and fourth floating electrode plates 331, 332, 333 and 334 may be varied thereby changing the uniformity of the laser gas discharge.

Figure 10:
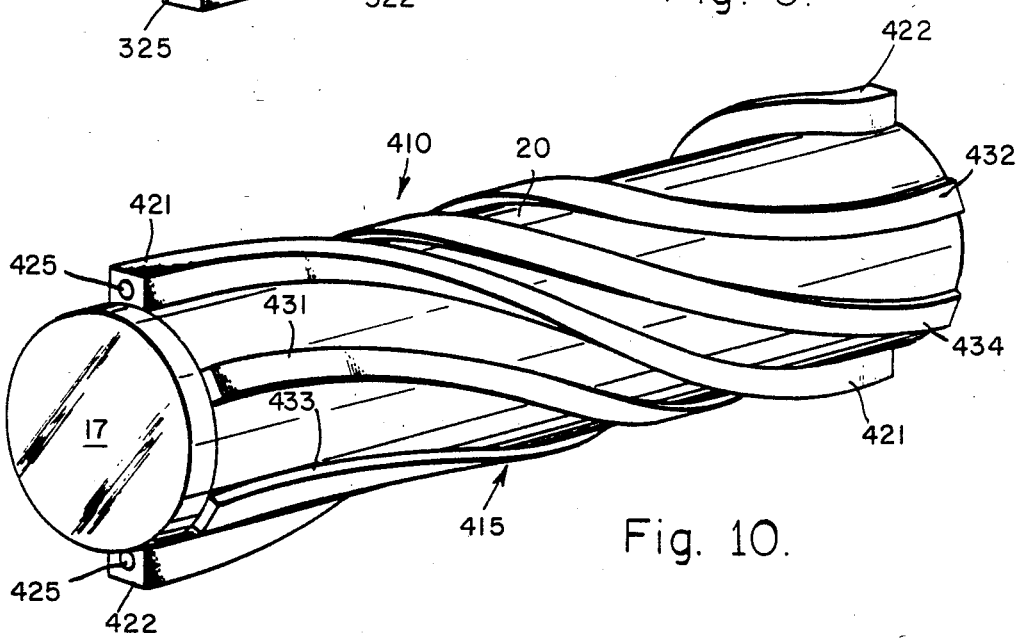
FIG. 10 is a perspective view of a laser bore and electrode structure of a fifth transversely excited gas laser having a floater electrode configuration, each electrode of which is in the shape of a helix, which has been constructed in accordance with the principles of the fifth embodiment of the present invention.

Referring to FIG. 10 a fifth transversely excited gas laser 410 includes a laser bore and electrode structure 415 and an electrode configuration having a first electrode plate 421 and a second electrode plate 422 each of which is in the shape of a continuous helix and which are parallel and disposed oppositely to each other on the outer surface of the elongated cylindrical chamber 20. The phase correlation of the configuration of electrodes is such that the first electrode plate 421 and the second electrode plate 422 are 180 out of phase with each other. Each of the electrode plates 421 and 422 has a cooling bore 425 through which a coolant can flow and is formed from an electrically conductive material, such as aluminum or copper.

Referring still to FIG. 10 the electrode configuration also has a first floating electrode plate 431, a second floating electrode plate 432, a third floating electrode plate 433 and a fourth floating electrode plate 434, each of which is formed from an electrically conductive material and is in the shape of continuous helix and each of which is disposed on the outer surface of the elongated cylindrical chamber 20. The first floating electrode plate 431 is disposed between the first electrode plate 421 and the third floating electrode plate 433 and oppositely to the second electrode plate 432. The second floating electrode plate 432 is disposed between the second electrode plate 422 and the fourth floating electrode plate 434 and oppositely to the second floating electrode plate 432. The capacitance between the first and second electrode plates 421 and 422 and the first, second, third and fourth floating electrode plates 431, 432, 433 and 434 may be varied thereby changing the uniformity of the laser gas discharge.

Figure 11:
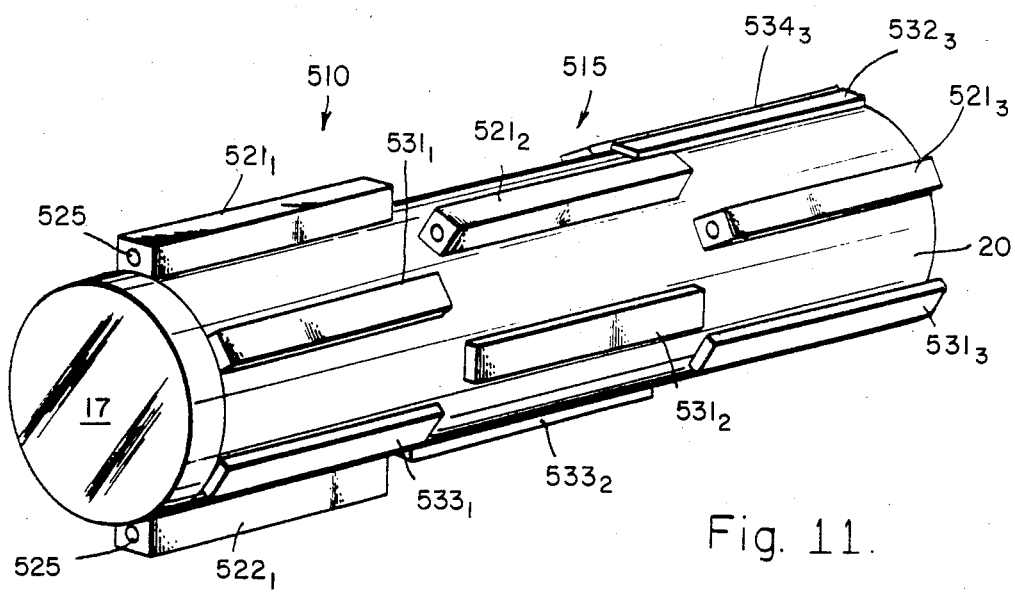
FIG. 11 is a perspective view of a laser bore and electrode structure of a sixth transversely excited gas laser having a floater electrode configuration, each electrode of which is in the shape of a stepped helix, which has been constructed in accordance with the principles of the sixth embodiment of the present invention.

Referring to FIG. 11 a sixth transversely excited gas laser 510 includes a laser bore and electrode structure 515 the configuration of the electrodes, each of which is in the shape of a stepped helix, includes a first pair of three longitudinally disposed electrode elements $521_1$, $521_2$ and $521_3$, which are disposed opposite to each other on the outer surface of the elongated cylindrical chamber 20 in a first plane and a second pair of three longitudinally disposed electrode elements $522_1$, $522_2$ and $522_3$, which are disposed opposite to each other on the outer surface of the elongated cylindrical chamber 20 in a second plane which is orthogonal to the first plane. The phase correlation of the configuration of electrodes is such that each of the first pair of plurality of electrode elements 521, 521 and 521 is in phase with the other, each of the second pair of plurality of electrode elements $522_1$, $522_2$ and $522_3$ is in phase with the other and the first and second pairs of electrode elements $521_1$, $521_2$, $521_3$, $522_1$, $522_2$ and $522_3$, are 180° out of phase with each other. Each of the electrode elements $521_1$, $521_2$, $521_3$, $522_1$, $522_2$ and $522_3$ has a cooling bore 325 through which a coolant can flow and is formed from an electrically conductive material, such as aluminum or copper.

Referring still to FIG. 11 the electrode configuration also has a first set of floating electrode elements $531_1$, $531_2$ and $531_3$, a second set of floating electrode elements $532_1$, $532_2$ and $532_3$, a third set of floating electrode elements $533_1$, $533_2$ and $533_3$ and a fourth set of floating electrode elements $534_1$, $534_2$ and $534_3$, each of which is formed from an electrically conductive material and each of which is in the shape of a stepped helix. The first set of floating electrode elements 531 is disposed between the first set of electrode elements 521 and the third set of floating electrode elements 533 and oppositely to the second set of floating electrode elements 532. The second set of floating electrode elements 532 is disposed between the second set of electrode elements 522 and the fourth set of floating electrode elements 534 and oppositely to the second set of floating electrode elements 532. The capacitance between the first and second sets of electrode elements 521 and 522 and the first, second, third and fourth sets of floating electrode elements 531, 532, 533 and 534 may be varied thereby changing the uniformity of the laser gas discharge.

Figure 12:
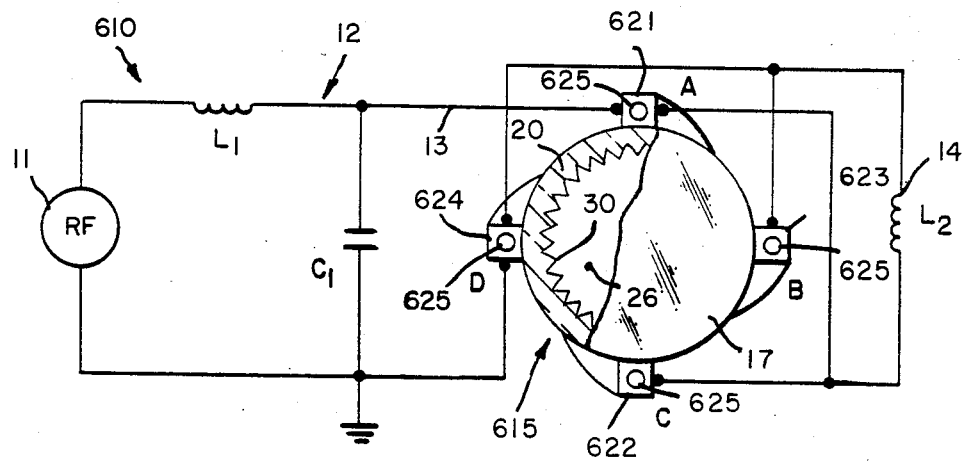
FIG. 12 is a schematic drawing of a seventh transversely excited gas laser and includes an end elevation view in partial cross-section of a laser bore and electrode structure having an electrode configuration each of the electrodes of which is in the shape of a continuous helix and which has been constructed in accordance with the principles of the seventh embodiment of the present invention.

Referring to FIG. 12 a seventh transversely excited gas laser 610 includes an rf generator 11 which has a first output and a second output, which is at ground and which is electrically coupled to the feedpoints B and D of the seventh transversely excited gas laser 610, a first coupling circuit 12 which includes a first inductor, $L_1$, which electrically couples the first output of the rf generator 11 to feedpoints A and C of the seventh transversely excited gas laser 610 and a coaxial connector 13 which electrically couples first output of the rf generator 11 to the first coupling circuit 12. The first coupling circuit 12 also includes a first capacitor, $C_1$, which electrically couples the first and second outputs of the rf generator 11. A second coupling circuit 14 includes a second inductor, $L_2$, which electrically couples feedpoints A and C to feedpoints B and D of a laser bore and electrode structure 615. The seventh transversely excited gas laser 610 also includes a pair of optical reflectors 17 which form a laser resonator.

Figure 13:
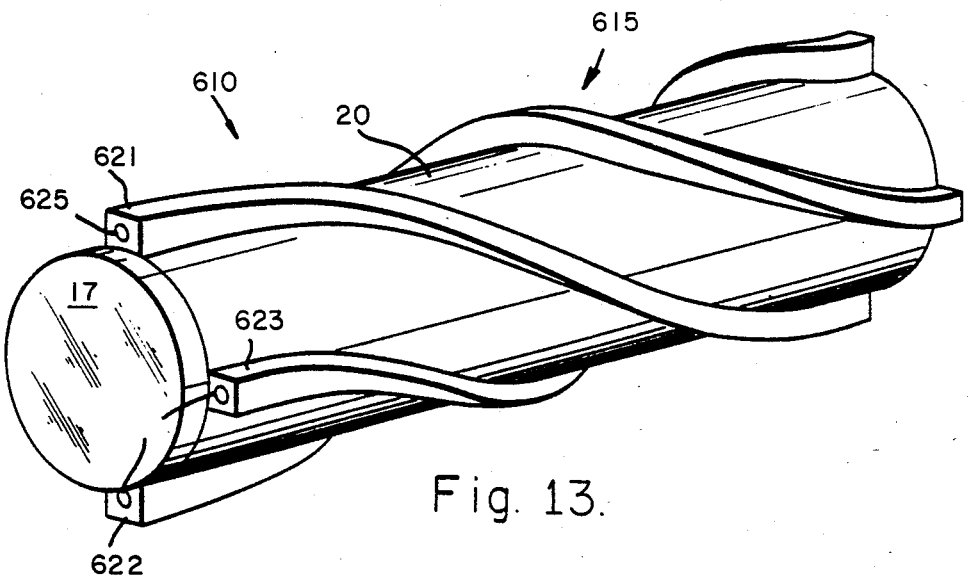
FIG. 13 is a perspective view of the laser bore and the electrode structure of FIG. 12.

Referring to FIG. 12 in conjunction with FIG. 13 the configuration of the electrodes, each of which is formed from an electrically conductive material and is in the shape of a continuous helix, includes a first electrode plate 621 and a second electrode plate 622 which are disposed opposite to each other on the outer surface of the chamber 20 in a first plane and a third electrode plate 623 and a fourth electrode plate 624 which are disposed opposite to each other on the outer surface of the chamber 20 in a second plane which is orthogonal to the first plane. Each of electrode plates 621, 622, 623 and 624 has a cooling bore 625 through which a coolant can flow and is formed from an electrically conductive material, such as aluminum or copper. The phase correlation of the configuration of electrodes is such that the first and second electrode plates 621 and 622 are in phase with each other and the third and fourth electrode plates 623 and 624 are in phase with each other and the first and third electrode plates 621 and 623 are 180° out of phase with each other. The laser discharge will occur around the outside of the cylindrical wall of the elongated cylindrical chamber 20 and the electrode plates 621, 622, 623 and 624 are symmetrically disposed whereby the laser discharge is "doughnut" shaped.

Figure 14:
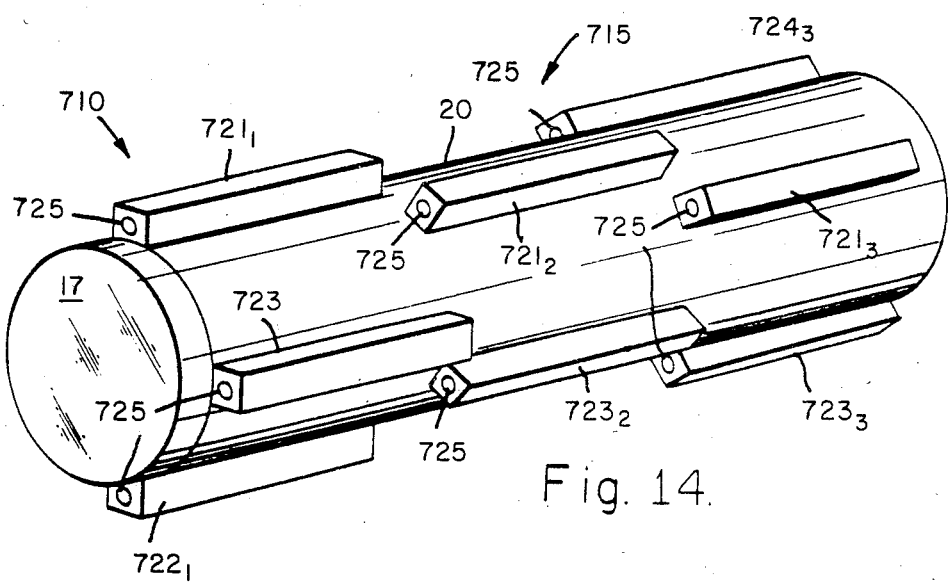
FIG. 14 is a perspective view of a laser bore and electrode structure of an eighth transversely excited gas laser having an electrode configuration each electrode of which is in the shape of a stepped helix and which has been constructed in accordance with the principles of the eighth embodiment of the present invention.

Referring to FIG. 14 an eighth transversely excited gas laser 710 includes a laser bore and electrode structure 715 the configuration of the electrodes, each of which is in the shape of a stepped helix, includes a first pair of three longitudinally disposed electrode plate elements $722_1$, $722_2$ and $722_3$ which are disposed opposite to each other on the outer surface of the elongated cylindrical chamber 20 in a first plane and a second pair of three longitudinally disposed electrode plate elements $723_1$, $723_2$ and $723_3$ which are disposed opposite to each other on the outer surface of the elongated cylindrical chamber 20 in a second plane which is orthogonal to the first plane. The phase correlation of the configuration of electrodes is such that each of the first pair of plurality of electrodes $722_1$, $722_2$ and $722_3$ is in phase with the other, each of the second pair of plurality of electrode plate elements $723_1$, $723_2$ and $723_3$ is in phase with the other and the first and second pairs of electrodes $722_1$, $722_2$, $722_3$, $723_1$, $723_2$ and $723_3$ are 180° out of phase with each other.

Figure 15:
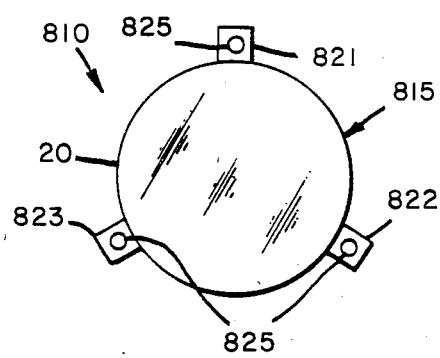
FIG. 15 is an end elevational view of a laser bore and electrode structure of a ninth transversely excited gas laser having an electrode configuration which has three elongated rectangular electrodes which are disposed longitudinally and which are spaced 120 degrees apart from each other and which has been constructed in accordance with the principles of the ninth embodiment of the present invention.

Referring to FIG. 15 a ninth transversely excited gas laser 810 includes a laser bore and electrode structure 815 has a configuration of the electrodes which a first electrode plate 821 which is disposed to the other on the outer surface of the elongated cylindrical chamber 20 in a first plane with the center of the elongated cylindrical chamber 20, a second electrode plate 822 which is disposed on the outer surface of the elongated cylindrical chamber 20 in a second plane which is intersects the first plane at an angle of 120° at the center of the elongated cylindrical chamber 20 and a third electrode plate 823 which is disposed on the outer surface of the elongated cylindrical chamber 20 in a third plane which intersects the second plane at an angle of 120° at the center of the elongated cylindrical chamber 20. The phase correlation of the configuration of electrodes is such that the first electrode plate 821 is in 120° out of phase with the second electrode plate 822 and the second electrode plate 822 is 120° out of phase with the third electrode plate 823.

Figure 16:
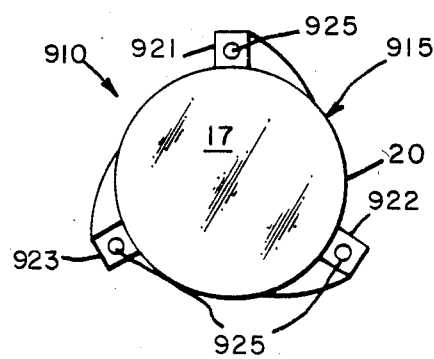
FIG. 16 is an end elevational view of a laser bore and electrode structure of a tenth transversely excited gas laser having an electrode configuration which has three electrodes, each of which is in the shape of a continuous helix and which are spaced 120 degrees apart from each other, and which has been constructed in accordance with the principles of the tenth embodiment of the present invention.

Referring to FIG. 16 a tenth transversely excited gas laser 910 includes a laser bore and electrode structure 915 has a configuration of the electrodes, each of which is in the shape of a continuous helix, includes a first longitudinally disposed electrode plate 921, which is disposed on the outer surface of the elongated cylindrical chamber 20 in a first plane with the center of the elongated cylindrical chamber 20, a second electrode plate 922 which is disposed on the outer surface of the elongated cylindrical chamber 20 in a second plane which is intersects the first plane at an angle of 120° at the center of the elongated cylindrical chamber 20 and a third electrode plate 923 which is disposed on the outer surface of the elongated cylindrical chamber 20 in a third plane which intersects the second plane at an angle of 120° at the center of the elongated cylindrical chamber 20. The phase correlation of the configuration of electrodes is such that the first electrode 921 is 120° out of phase with the second electrode plate 922 and the second electrode plate 922 is 120° out of phase with the third electrode plate 323. In a similar embodiment the configuration of the electrodes, each of which is in the shape of a stepped helix, may includes a first pair of three longitudinally disposed electrode plate elements which are disposed on the outer surface of the elongated cylindrical chamber 20 in the first plane, a second pair of three longitudinally disposed electrode plate elements which are disposed on the outer surface of the elongated cylindrical chamber 20 in the second plane and a third pair of three longitudinally disposed electrode plate elements which are disposed on the outer surface of the elongated cylindrical chamber 20 in the third plane.

Figure 17:
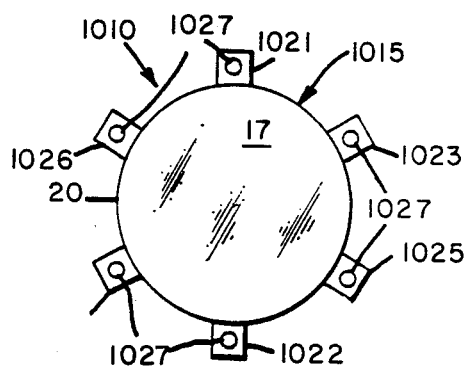
FIG. 17 is an end elevational view of a laser bore and electrode structure of an eleventh transversely excited gas laser having an electrode configuration which has a plurality, N (N=3), of pairs of elongated rectangular electrodes which are disposed longitudinally and which are spaced 360/2N (60) degrees apart from each other and which has been constructed in accordance with the principles of the eleventh embodiment of the present invention.

Referring to FIG. 17 an eleventh transversely excited gas laser 1010 includes a laser bore and electrode structure 1015 has a configuration of the electrodes which a first electrode plate 1021 and a second electrode plate 1022 which are oppositely disposed to each other on the outer surface of the elongated cylindrical chamber 20 in a first plane with the center of the elongated cylindrical chamber 20, a third electrode plate 1023 and a fourth electrode plate 1024 which are oppositely disposed to each other on the outer surface of the elongated cylindrical chamber 20 in a second plane which is intersects the first plane at an angle of 60° at the center of the elongated cylindrical chamber 20 and a fifth electrode plate 1025 and a sixth electrode plate 1026 pair which are oppositely disposed to each other on the outer surface of the elongated cylindrical chamber 20 in a third plane which is intersects the second plane at an angle of 60° at the center of the elongated cylindrical chamber 20. The phase correlation of the configuration of electrodes is such that first, third and fifth electrode plates 1021, 1023 and 1025 are in phase with each other and the second, fourth and sixth electrode plates 1022, 1024 and 1026 are in phase with each other, but are 180° out of phase with the first, third and fifth electrode plates 1021, 1023 and 1025.

Figure 18:
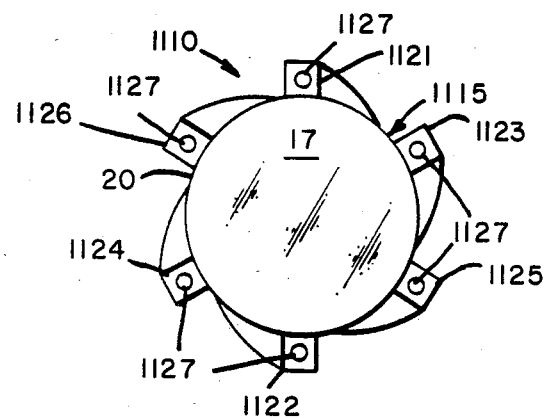
FIG. 18 is an elevational view of a laser bore and electrode structure having an electrode configuration of a twelfth transversely excited gas laser which has a plurality, N (N=3), of pairs of electrodes, each of which is in the shape of a continuous helix and which are spaced 360/2N (60) degrees apart from each other, and which has been constructed in accordance with the principles of the twelfth embodiment of the present invention.

Referring to FIG. 18 a twelfth transversely excited gas laser 1110 includes a laser bore and electrode structure 1115 has a configuration of the electrodes, each of which is in the shape of a continuous helix, includes a first electrode plate 1121 and a second electrode plate 1122, which are oppositely disposed to each other on the outer surface of the elongated cylindrical chamber 20 in a first plane with the center of the elongated cylindrical chamber 20, a third electrode plate 1123 and a fourth electrode plate 1124, which are oppositely disposed to each other on the outer surface of the elongated cylindrical chamber 20 in a second plane which is intersects the first plane at an angle of 60° at the center of the elongated cylindrical chamber 20 and a fifth electrode plate 1125 and a sixth electrode plate 1126, which are oppositely disposed to each other on the outer surface of the elongated cylindrical chamber 20 in a third plane which is intersects the second plane at an angle of 60° at the center of the elongated cylindrical chamber 20. The phase correlation of the configuration of electrodes is such that the first, third and fifth electrode plates 1021, 1023 and 1025 are in phase with each other and second, fourth and sixth electrode plates 1022, 1024 and 1026 are in phase with each other, but are 180° out of phase with the first, third and fifth electrode plates 1021, 1023 and 1025. In a similar embodiment the configuration of the electrodes, each of which is in the shape of a stepped helix, may includes a first set of three longitudinally disposed electrode plate elements and a second set of three longitudinally disposed electrode plate elements which are oppositely disposed to each on the outer surface of the elongated cylindrical chamber 20 in the first plane, a third set of three longitudinally disposed electrode plate elements and a fourth set of three longitudinally disposed electrode plate elements which are oppositely disposed to each on the outer surface of the elongated cylindrical chamber 20 in the second plane, a fifth set of three longitudinally disposed electrode plate elements and a sixth set of three longitudinally disposed electrode plate elements which are oppositely disposed to each on the outer surface of the elongated cylindrical chamber 20 in the third plane.

From the foregoing it can be seen that an elongated cylindrical chamber having a plurality of grooves for use with a variety of configurations for electrodes for transversely excited gas lasers in order to achieve optical mode control has been described. It should be noted that distances of and between the figures are not to be considered significant.

Accordingly it is intended that the foregoing disclosure and showing made in the drawing shall be considered only as an illustration of the principles of the present invention.

What is claimed is:
1. An improved gas laser comprising:
 a. an elongated cylindrical chamber of cross-sectional dimension which has an internal cylindrical wall and which is suitable for confining a laser gas discharge wherein said internal cylindrical wall has a plurality of grooves on its internal wall surface which absorbs any light energy which is being reflected by the internal wall surface;
 b. a laser gas disposed in said elongated cylindrical chamber;
 c. first and second electrode means for exciting said laser gas;
 d. energy means for applying a voltage between said first and second electrode means in order to establish a laser gas discharge in said laser gas; and
 e. first and second reflecting means for reflecting light energy from said laser gas discharge within said elongated cylindrical chamber so that said light energy travels longitudinally the length of said elongated cylindrical chamber and is optically independent of the internal walls of said elongated cylindrical chamber whereby said plurality of grooves absorbs any light energy which is not being reflected by said first and second reflecting means in order to provide optical mode control.

2. An improved gas laser according to claim 1 wherein said first and second reflecting means provide a stable resonator whereby said improved gas laser generates a $TEM_{00}$ mode.

3. An improved gas laser according to claim 1 wherein said first and second reflecting means provide an unstable (geometric) resonator whereby said improved gas laser generates a geometric annular mode.

* * * * *